United States Patent [19]
Smith

[11] 3,712,765
[45] Jan. 23, 1973

[54] FLUID HANDLING APPARATUS
[75] Inventor: Jozef R. Smith, Santa Ana, Calif.
[73] Assignee: International Telephone and Telegraph Corp., New York, N.Y.
[22] Filed: April 3, 1970
[21] Appl. No.: 25,399

[52] U.S. Cl. ..................... 418/70, 418/154, 277/93
[51] Int. Cl. .......... F16j 15/54, F01c 5/00, F04c 5/00
[58] Field of Search ........ 418/153, 154, 155, 70, 152, 418/156; 277/41, 87, 93; 287/53

[56] References Cited

UNITED STATES PATENTS

| 3,097,610 | 7/1963 | Swanson | 418/269 |
|---|---|---|---|
| 2,272,526 | 2/1942 | Keeran | 277/93 |
| 2,365,146 | 12/1944 | Wichorek | 277/93 |
| 2,882,830 | 4/1959 | McDuffie | 418/154 |
| 3,303,790 | 2/1967 | McCray | 418/153 |
| 2,858,769 | 11/1958 | Doble | 418/154 |
| 2,898,863 | 8/1959 | Wotring et al. | 418/200 X |
| 2,782,723 | 2/1957 | Doble et al. | 418/154 |
| 2,995,391 | 8/1961 | Snyder | 277/93 X |
| 3,003,796 | 10/1961 | Meyer | 277/93 X |

*Primary Examiner*—Carlton R. Croyle
*Assistant Examiner*—John J. Vrablik
*Attorney*—C. Cornell Remsen, Jr., Walter J. Baum, Paul W. Hemminger, Charles L. Johnson, Jr. and Thomas E. Kristofferson

[57] ABSTRACT

A rubber impeller pump including an annular seal. The seal is fixed to a drive cup so that the pump may be entirely dismantled for replacement or repair without disturbing or damaging the seal.

1 Claim, 5 Drawing Figures

PATENTED JAN 23 1973 3,712,765
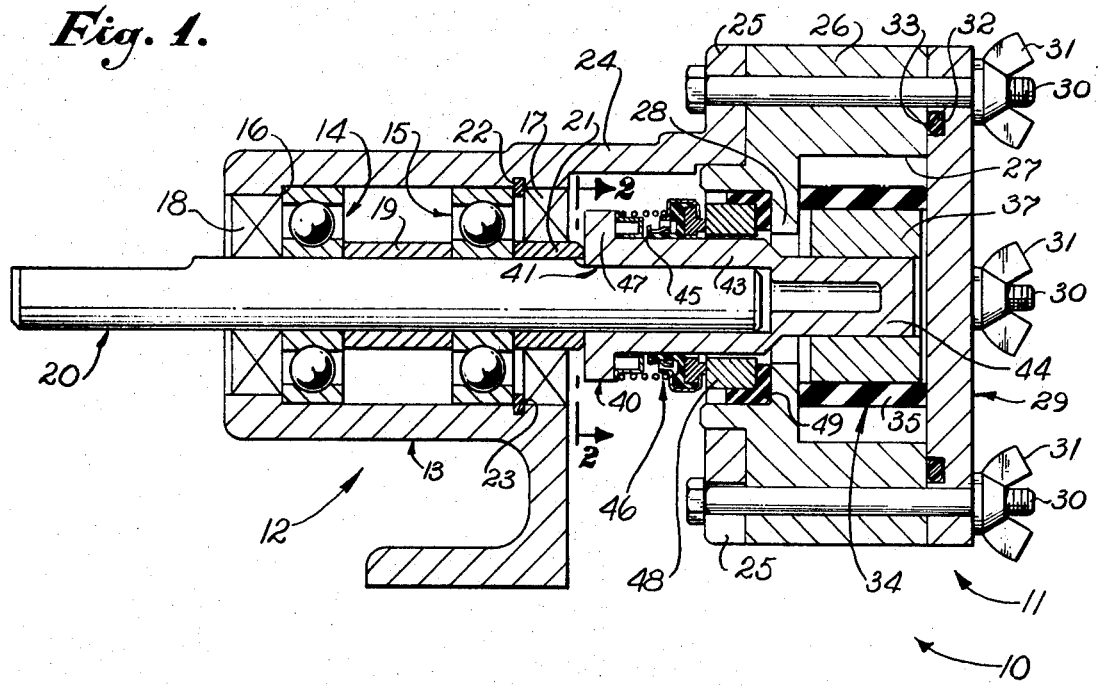
Fig. 1.
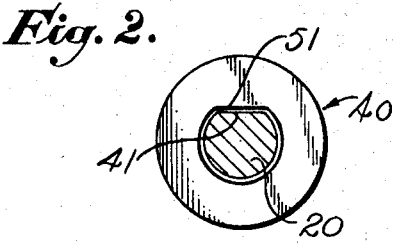
Fig. 2.
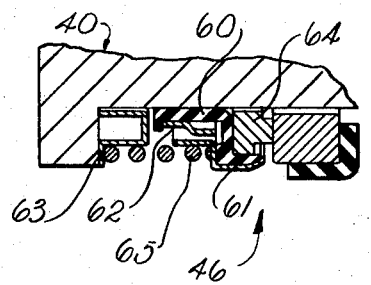
Fig. 3.
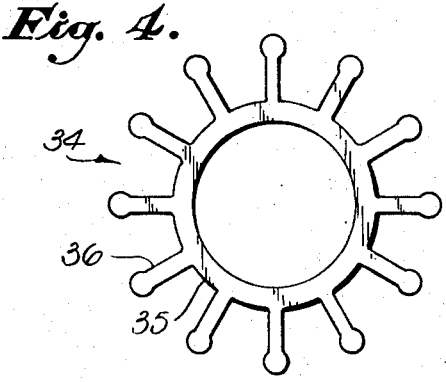
Fig. 4.
Fig. 1a.
INVENTOR.
JOZEF R. SMITH.
BY
ATTORNEY.

3,712,765

FLUID HANDLING APPARATUS

BACKGROUND OF THE INVENTION

This invention relates to fluid handling apparatus and, more particularly, to a drive connection for a pump or the like.

The device of the present invention may be used in a great many applications other than those disclosed herein. However, the invention has been found to be especially advantageous when used with a rubber impeller pump. The following is a list of some of such pumps which are prior art to the device of the present invention: U. S. Pat. Nos. 2,782,723; 2,853,021; 2,858,769; 2,881,710; 2,971,469; 2,976,811; 3,303,791; and 3,467,019.

In the past, a fluid-tight seal has been employed between the pump body and the drive shaft of a rubber impeller pump. This seal is fixed to the pump body. The drive shaft, thus, rotates inside of and thereby rubs against this seal.

It has been almost impossible to replace or to repair a prior art impeller or any other component part without disturbing the seal.

SUMMARY OF THE INVENTION

In accordance with the device of the present invention, the abovedescribed and other disadvantage of the prior art are overcome by providing a seal fixed to a rotary member to provide, e.g., a thrust bearing seal. In each case, when the seal is used in a rubber impeller pump, the impeller is replaceable without disturbing or damaging the seal.

It is another feature of the invention that a drive cup is employed, e.g., between a drive shaft and the impeller. The drive shaft, thus, need not be chemically resistant when the pump is employed to circulate chemicals. Further, if the seal is fixed to the cup, the seal and cup may be removed from the pump as a subassembly without damaging the seal.

The above-described and other advantages of the invention will be better understood from the following description when considered in connection with the accompanying drawings.

BRIEF DESCRIPTION OF THE DRAWINGS

In the drawings, which are to be regarded as merely illustrative:

FIG. 1 is a longitudinal sectional view of a rubber impeller pump;

FIG. 1A is an enlarged sectional view of the seal shown in FIG. 1;

FIG. 2 is an end elevational view of the drive cup taken on the line 2—2 shown in FIG. 1;

FIG. 3 is another end elevational view of the drive cup; and

FIG. 4 is an end elevational view of a rubber impeller.

DESCRIPTION OF THE PREFERRED EMBODIMENT

The device of the present invention is indicated at 10 in FIG. 1 of the drawings. Device 10 includes a rubber impeller pump 11 and a bearing assembly 12. Bearing assembly 12 includes bearing housing 13 having bearings 14 and 15 supported therein. Bearing 14 rests against shoulder 16 formed in housing 13. Lip seals 17 and 18 are provided for housing 13. Bearings 14 and 15 are held in fixed, spaced relation by a cylindrical spacer 19 loose on a drive shaft 20. The left end of drive shaft 20 is rotatably and axially fixed to a motor or driving means, not shown.

A cylindrical stop 21 is pressed on shaft 20 and fixed thereto so that it cannot rotate relative thereto or slide axially therealong. Snap ring 22 is fitted in a recess 23 of housing 13 to hold bearing 15 in place against cylinder 19, and to provide a seat for seal 17.

Housing 13 has an extension 24 integral therewith. Extension 24 has a ring 25 integral therewith. Ring 25 extends around the axis of drive shaft 20 360 mechanical degrees. Extension 24 may extend around the axis of drive shaft 20 180° or more or less.

Pump 11 includes pump body 26. Pump body 26 has a cylindrical cavity 27 therein which is bounded by a flange 28 integral with body 26 and a cover plate 29.

Ring 25, body 26, and plate 29 are fixed together by four bolts 30 having wing nuts 31. Of course, any number of bolts may be used.

Plate 29 has an annular recess 32 in which an O-ring 33 is located.

Pump body 26 has a rubber impeller 34 located in cavity 27. Impeller 34 includes a rubber part 35 shown in FIG. 4 with radial projections 36. A rigid insert 37 is fixed inside part 35. Insert 37 is a perfect right cylinder except that it is hollow and has flat portions 38 and 39 as shown in FIG. 3. Insert 37 is fixed so that it cannot slide axially inside part 35 or rotate relative thereto. As shown in FIGS. 1, 2, and 3, a drive cup 40 is slidable axially on drive shaft 20. Drive shaft 20 is substantially a perfectly solid cylinder except for flat portion 41 shown in FIG. 2.

Drive cup 40 has a portion 43 which surrounds the end of drive shaft 20 and a portion 44 which is located inside insert 37.

Portion 43 has a perfectly cylindrical surface at 45 on which a seal 46 is positioned. Drive cup 40 has flange 47 that holds seal 46 against a seal seat 48 which is sealed to pump body 26 by a rubber grommet 49.

Seal 46 includes a rubber ring 60, three metal rings 61, 62, and 63, and an annular pure carbon nose piece 64. Ring 61 is pressed toward seat 48 by a helical spring 65. By itself, and unstressed, seal 46 is entirely convention.

As shown in FIG. 2, drive cup 40 has flat surface 51 which meet with drive shaft surfaces 41, respectively. Rotation of drive shaft 20 thereby causes rotation of drive cup 40.

In a similar manner as shown in FIG. 3, portion 44 of drive cup 40 has flat surfaces at 52 and 53 which mate with insert surfaces 39 and 38, respectively. Rotation of drive cup 40 by drive shaft 20, thus, causes rotation of both insert 37 and part 35 fixed thereto.

The entire construction shown in FIGS. 1 and 4 may be conventional except for stop 21, drive cup 40, seal 46, seal seat 48, grommet 49, pump body 26, and impeller insert 37.

Lip seals 17 and 18 are more or less dust seals and are simply pressed in.

One or more of any of the component parts shown in FIG. 1 may be made of a conventional epoxy. It has been found advantageous to make drive cup 40 out of an epoxy. Note will be taken that if seal seat 48, grommet 49, insert 37, part 35, plate 29 and O-ring 33 are resistant to chemicals, device 10 will be trouble free. In this case, pump body 26 or plate 29 may be made of an epoxy which is not attacked by chemicals.

The outside diameter of portion 43 on which seal 46 rests is greater than the unstressed inside diameter of seal 46. Seal 46 is, thus, maintained in tension around drive cup 40 at all times. An interference fit exists between seal 46 and drive cup 40. The parts are so dimensioned that when bolts 30 are tightened, seal 46 lies in axial compression against seal seat 48.

Seal seat 48 by itself may be entirely conventional as may also be grommet 49. Seal seat 48 is usually made of ceramic. Grommet 49 is usually made of rubber.

None of the component parts on the present invention are, by any means, limited to the particular materials set forth herein or to any other materials.

What is claimed is:

1. In fluid control apparatus, the combination comprising: fixed means including a stationary seal seat; a member rotatable with respect to said fixed means; and a seal fixed to said member in a position to slide against said seat, said seal and seat being annular and concentric with the axis of rotation of said member, said fixed means including a bearing assembly, a drive shaft rotatable in said bearing assembly, said member being a hollow cylindrical cup to fit over the end of said shaft each having a pair of flat surfaces so that rotation of said shaft causes rotation of said cup, said seal being resilient, said member having an outer cylindrical surface, said seal having an unstressed inside diameter smaller than that of said surface to provide for an interference fit on said surface, said member having an outwardly extending flange contiguous to said seal, positioning means to prevent said member from moving away from said seat, said positioning means being located to maintain said seal in axial compression against said seat, said positioning means being fixed with said bearing assembly, a pump body fixed to said bearing assembly, said body having an approximately cylindrical cavity therein concentric with the axis of said shaft, said cavity having an opening on opposite sides thereof through said body, said seat being sealed in a fluid-tight manner about one of said openings, a resilient impeller in said cavity having radially projecting blades to engage the cylindrical internal surface of said cavity, said impeller having a hollow insert molded therein at the center thereof, said insert being made of a material hard in comparison to that of said impeller, said cup having one end closed, said cup having a reduced diameter portion at said closed end, said shaft terminating at said reduced diameter portion, said reduced diameter portion and said insert each having a mating pair of flat surfaces to cause rotation of said impeller in unison with rotation of said member, a plate to cover said other cavity opening, said impeller being in axial compression between a wall of said cavity and said plate, a plurality of bolts to hold said bearing assembly, said body and said plate in fixed positions relative to each other, said body having a flat surface perpendicular to the axis of said shaft, said plate having a flat surface engaged with the flat surface of said body, and an O-ring seal around said other opening in compression between said body and said pate.

* * * * *